US012333001B2

(12) United States Patent
Chaffin et al.

(10) Patent No.: US 12,333,001 B2
(45) Date of Patent: Jun. 17, 2025

(54) MITIGATION OF RETURN STACK BUFFER SIDE CHANNEL ATTACKS IN A PROCESSOR

(71) Applicant: Ampere Computing LLC, Santa Clara, CA (US)

(72) Inventors: Benjamin Crawford Chaffin, Portland, OR (US); Bret Leslie Toll, Santa Clara, CA (US); Michael Stephen Chin, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 495 days.

(21) Appl. No.: 17/393,879

(22) Filed: Aug. 4, 2021

(65) Prior Publication Data
US 2022/0043908 A1 Feb. 10, 2022

Related U.S. Application Data

(60) Provisional application No. 63/060,977, filed on Aug. 4, 2020.

(51) Int. Cl.
  *G06F 21/55* (2013.01)
  *G06F 9/06* (2006.01)
  *G06F 21/52* (2013.01)
(52) U.S. Cl.
  CPC .............. *G06F 21/554* (2013.01); *G06F 9/06* (2013.01); *G06F 21/52* (2013.01); *G06F 21/556* (2013.01); *G06F 2221/033* (2013.01)
(58) Field of Classification Search
  CPC .......... G06F 9/06; G06F 21/52; G06F 21/556; G06F 2221/033
  See application file for complete search history.

(56) References Cited

U.S. PATENT DOCUMENTS 6,530,016 B1 * 3/2003 Ukai ..................... G06F 9/3844
                                                      712/240
9,223,979 B2 * 12/2015 Fischer ................ G06F 9/3861
(Continued)

FOREIGN PATENT DOCUMENTS

EP    3647945 A1    5/2020
GB    2589897 A  *  6/2021  ......... G06F 12/1441

OTHER PUBLICATIONS

Isaac Richter • Jie Zhou • John Criswell; DeTRAP: RISC-V Return Address Protection With Debug Triggers; 2024 IEEE Secure Development Conference (SecDev) (2024, pp. 166-177); (Year: 2024).*
(Continued)

*Primary Examiner* — Kari L Schmidt
*Assistant Examiner* — Chao Wang
(74) *Attorney, Agent, or Firm* — Withrow & Terranova, PLLC (57) ABSTRACT

Mitigation of return stack buffer side channel attacks in a processor. Detecting a side channel attack or a fault in a return from a function call in the processor includes receiving a return exception level indication (or e.g., a return security level indication) indicating the exception level associated with the return and comparing the exception level associated with the return to the exception level (or security level) associated with the return address. The return exception level indicator may be received in conjunction with a return indication. The processing circuit accesses the first entry of the return stack buffer, which indicates the return address of the function call, and also accesses an exception level associated with the return address. The processing circuit compares the exception level associated with the return address to the exception level associated with the return to determine whether to use the return address in a prediction of instruction flow.

30 Claims, 4 Drawing Sheets

(56) References Cited

U.S. PATENT DOCUMENTS

| | | | |
|---|---|---|---|
| 2002/0194463 A1* | 12/2002 | Henry | G06F 9/323 |
| | | | 712/E9.057 |
| 2014/0123286 A1* | 5/2014 | Fischer | G06F 21/566 |
| | | | 726/23 |
| 2017/0228535 A1* | 8/2017 | Shanbhogue | G06F 3/0673 |
| 2019/0042263 A1 | 2/2019 | Sukhomlinov et al. | |
| 2020/0192672 A1 | 6/2020 | Gonion et al. | |
| 2020/0372129 A1* | 11/2020 | Gupta | G06F 21/52 |

OTHER PUBLICATIONS

Wen-Fu Kao • Wu, S.F.; Lightweight Hardware Return Address and Stack Frame Tracking to Prevent Function Return Address Attack; 2009 International Conference on Computational Science and Engineering (vol. 2, 2009, pp. 859-866); (Year: 2009).*

H. Ozdoganoglu • T.N. Vijaykumar • C.E. Brodley • B.A. Kuperman • A. Jalote; SmashGuard: A Hardware Solution to Prevent Security Attacks on the Function Return Address; IEEE Transactions on Computers (vol. 55, Issue: 10, 2006, pp. 1271-1285); (Year: 2008).*

International Preliminary Report on Patentability for International Patent Application No. PCT/US2021/044496, mailed Nov. 24, 2022, 6 pages.

International Search Report and Written Opinion for International Patent Application No. PCT/US2021/044496, mailed Dec. 13, 2021, 12 pages.

Examination Report for European Patent Application No. 21762233. 1, mailed Mar. 11, 2024, 4 pages.

* cited by examiner

MITIGATION OF RETURN STACK BUFFER SIDE CHANNEL ATTACKS IN A PROCESSOR

PRIORITY APPLICATION

The present application claims priority under 35 U.S.C. § 119(e) to U.S. Provisional Patent Application Ser. No. 63/060,977, filed Aug. 4, 2020, and entitled "METHOD, APPARATUS, AND SYSTEM FOR MITIGATION OF RETURN STACK BUFFER SIDE CHANNEL ATTACKS," which is incorporated herein by reference in its entirety.

BACKGROUND

I. Field of the Disclosure

The technology of the disclosure relates generally to side channel attack mitigation in a processor, and specifically to the mitigation of side channel attacks on return stack buffers based on branch behavior in the processor.

II. Background

Processors may execute complex programs, which may include numerous changes in the execution flow of the code. Conventionally, these changes in execution flow may be accomplished through the use of varying types of branch instructions. Some of the branch instructions may be unconditional (meaning that their behavior is always the same). Other branch instructions may be conditional (meaning that they may or may not cause branching, based on some condition). Because modern processors are conventionally pipelined, it is important to accurately predict the direction of the execution of a program, so that the needed younger instructions in the resolved instruction flow path following the conditional branch instruction can be fetched ahead of time from a memory system. In this manner, the pipeline does not have to be stalled until the conditional branch instruction is executed and its condition actually resolved. If the needed younger instructions are not already in a cache of the processor, where they can be quickly accessed, the processor may need to stall until they have been retrieved, which compromises performance.

In an effort to predict the direction of execution of a program in which branch instructions are involved, processors conventionally employ one or more branch predictors. The function of a branch predictor is to attempt to predict the direction of one or more branch instructions, in which a branch (e.g., change to instruction flow) may be unconditional (e.g., always taken) or conditional (e.g., taken only if a condition is met). The branch predictor attempts to predict the direction to be taken so that the processor may fetch instructions in the predicted instruction flow path based on the prediction, and speculatively process those instructions. The processing is speculative because the branch prediction may turn out to be incorrect. Where the prediction is incorrect, the processor will take corrective action, such as flushing the incorrect speculatively processed instructions out of the pipeline and retrieving the correct instructions in the resolved instruction flow path before proceeding with further processing of such instructions.

Certain security attacks have been developed to take advantage of the relationship between the branch instructions and the behaviors of branch predictors. Branch predictors conventionally base their predictions on recent instruction flow. One security attack involves "training" a branch predictor using one software context, such that the predictor will make predictions in another software context based on that training. These predictions may cause privileged code to be speculatively executed and information can be obtained from the speculative activity. In order to combat these kinds of attacks, some processor architectures have adopted requirements that the branch predictor must be context-aware (i.e., predictions made in one context may not be allowed to influence predictions in another context). For some types of branch predictors which operate based on tag lookups, this requirement may be met by simply including context information with the tag. However, some types of branch predictors (e.g., return stack buffers, which track function calls and returns) do not conventionally include a tag lookup, and thus it is impractical to address these kind of attacks simply by adding context information to them, as doing so would involve management and storage of an impractical amount of additional information (and resultant silicon area). Thus, a solution that addresses decoupling software context from such branch predictors while remaining efficient from an information and physical design perspective would be desirable.

SUMMARY OF THE DISCLOSURE

Aspects disclosed in the detailed description include mitigation of return stack buffer side channel attacks in a processor. In response to a software function call in a processed fetched instruction, the processor stores a return address indicator in a first entry of a return stack buffer. The return address indicator points to (i.e., "indicates") a predicted next instruction (e.g., next sequential instruction in a sequence of instructions) to which execution is predicted to return after the function call. In exemplary aspects, a call exception level indication indicating an exception level associated with the return address of the function call is also stored. Detecting a side channel attack or a fault in a return from a function call in the processor includes receiving a return exception level indication indicating the exception level associated with a return from the function call and comparing the exception level associated with the return to the stored exception level associated with the return address. The return exception level indicator is received in conjunction with a return indication. The processor accesses the first entry of the return stack buffer, which indicates the return address of the function call, and also accesses an exception level associated with the return address. The processor then compares the exception level associated with the return address to the exception level associated with the return. When the exception level associated with the return address matches the exception level associated with the return, the return address is used in a prediction of instruction flow (e.g., to determine instructions to be fetched for speculative execution). When the exception level associated with the return address does not match the exception level associated with the return, the return address is not used in the prediction of instruction flow.

In this regard, in one exemplary aspect, a processing circuit in a processor is disclosed. The processing circuit is configured to receive a return indication indicating a return from a function call; receive a return exception level indication indicating an exception level associated with the return; access a first entry of a return stack buffer comprising a return address indication indicating a return address; access a call exception level indication indicating an exception level associated with the return address; compare the exception level associated with the return to the exception level associated with the return address; and in response to the exception level associated with the return matching the exception level associated with the return address, use the return address for a prediction of instruction flow.

In another exemplary aspect, a method of returning from a function call in a processing circuit in a processor is disclosed. The method comprises receiving a return indication indicating a return from a function call; receiving a return exception level indication indicating an exception level associated with the return; accessing a first entry of a return stack buffer comprising a return address indication indicating a return address; accessing a call exception level indication indicating an exception level associated with the return address; comparing the exception level associated with the return to the exception level associated with the return address; and in response to the exception level associated with the return matching the exception level associated with the return address, using the return address for a prediction of instruction flow.

In another exemplary aspect, a non-transitory computer-readable medium comprising instructions which, when executed by a processor, cause the processor to receive a return indication indicating a return from a function call; receive a return exception level indication indicating an exception level associated with the return; access a first entry of a return stack buffer comprising a return address indication indicating a return address; access a call exception level indication indicating an exception level associated with the return address; compare the exception level associated with the return to the exception level associated with the return address; and in response to the exception level associated with the return matching the exception level associated with the return address, use the return address for a prediction of instruction flow.

In another exemplary aspect, a processing circuit in a processor is disclosed. The processing circuit comprises a means for receiving a return indication indicating a return from a function call; a means for receiving a return exception level indication indicating an exception level associated with the return; a means for accessing a first entry of a return stack buffer comprising a return address indication indicating a return address; a means for accessing a call exception level indication indicating an exception level associated with the return address; a means for comparing the exception level associated with the return to the exception level associated with the return address; and a means for using the return address for a prediction of instruction flow in response to the exception level associated with the return matching the exception level associated with the return address.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include mitigation of return stack buffer side channel attacks in a processor. In response to a software function call in a processed fetched instruction, the processor stores a return address indicator in a first entry of a return stack buffer. The return address indicator points to (i.e., "indicates") a predicted next instruction (e.g., next sequential instruction in a sequence of instructions) to which execution is predicted to return after the function call. In exemplary aspects, a call exception level indication indicating an exception level associated with the return address of the function call is also stored. Detecting a side channel attack or a fault in a return from a function call in the processor includes receiving a return exception level indication indicating the exception level associated with a return from the function call and comparing the exception level associated with the return to the stored exception level associated with the return address. The return exception level indicator is received in conjunction with a return indication. The processor accesses the first entry of the return stack buffer, which indicates the return address of the function call, and also accesses an exception level associated with the return address. The processor then compares the exception level associated with the return address to the exception level associated with the return. When the exception level associated with the return address matches the exception level associated with the return, the return address is used in a prediction of instruction flow (e.g., to determine instructions to be fetched for speculative execution). When the exception level associated with the return address does not match the exception level associated with the return, the return address is not used in the prediction of instruction flow.

Aspects disclosed in the detailed description also include a return stack buffer comprising a plurality of entries, each entry having a return address portion and an exception level portion. The return stack buffer is configured to receive a return from a function call having an associated exception level and compare the exception level associated with a return with an exception level stored in a current entry of the return stack buffer. The return stack buffer is further configured to use the current entry for prediction if the exception level associated with the return matches the exception level stored in the current entry, and not to use the current entry for prediction if the exception level associated with the return does not match the exception level stored in the current entry.

Before discussing examples of mitigating return stack buffer side channel attacks in a processor starting at FIG. 2, an exemplary processor 100 in a processor-based system 102 is first discussed below with regard to FIG. 1.

Figure 1:
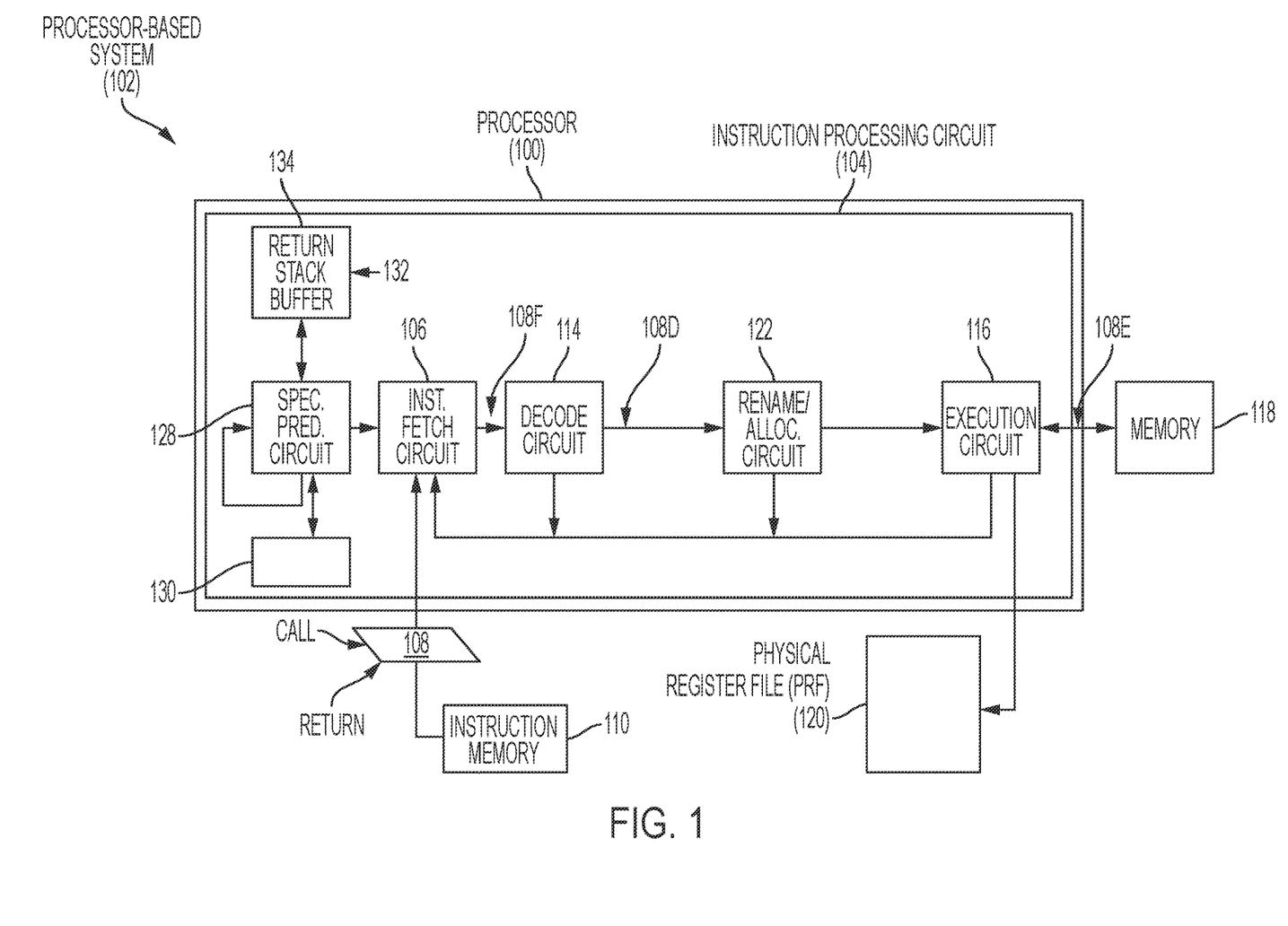
FIG. 1 is a diagram of an exemplary processor that includes an exemplary instruction processing circuit that includes a return stack buffer configured to mitigate return stack buffer side channel attacks.

In this regard, FIG. 1 is a diagram of an exemplary processor 100 that is part of a processor-based system 102. The processor 100 may be an in-order or an out-of-order processor (OoP) as non-limiting examples. The processor 100 includes an instruction processing circuit 104 that includes an instruction fetch circuit 106 configured to fetch instructions 108 from an instruction memory 110. The instruction memory 110 may be provided in or as part of a system memory in the processor-based system 102 as an example. The instruction fetch circuit 106 in this example is configured to provide the fetched instructions 108F to be decoded in a decode circuit 114 to generate decoded instruction 108D that are executed in an execution circuit 116. A produced value 108E generated by the execution circuit 116 from executing the decoded instruction 108D is committed (i.e., written back) to a storage location indicated by the destination of the decoded instruction 108I). This storage location could be memory 118 in the processor-based system 102 or a physical register $P_0$-$P_X$ in a physical register file (PRY) 120, as examples.

With continuing reference to FIG. 1, once fetched instructions 108F are decoded into decoded instructions 108D, the decoded instructions 108D are provided to a rename/allocate circuit 122 in the instruction processing circuit 104. The rename/allocate circuit 122 is configured to determine if any register names in the decoded instructions 108I) need to be renamed to break any register dependencies that would prevent parallel or out-of-order processing.

The processor 100 also includes a speculative prediction circuit 128 that is configured to speculatively predict a value associated with an operation in the processor 100. In an example, the speculative prediction circuit 128 is configured to predict a condition of a conditional control instruction 108, such as a conditional branch instruction, that will govern in which instruction flow path next instructions 108 are fetched by the instruction fetch circuit 106 for processing. For example, if the conditional control instruction 108 is a conditional branch instruction, the speculative prediction circuit 128 can predict whether a condition of the conditional branch instruction 108 will be later resolved in the execution circuit 116 as either "taken" or "not taken." The speculative prediction circuit 128 makes a prediction of the instruction flow based on information including, for example, a prediction history indicator 130.

The instruction flow in the processor 100 includes executing a user application, functions, an operating system, etc., that can have different restrictions and privileges. In some examples, exception levels are used to identify a privilege level that indicates a level of authority, for example, of a program, which may determine what information and functions are available to the program. Security levels are another type of indicator that can be used to distinguish privilege or access limits of a program. A function call is an instruction in a calling program to call a function program to perform a particular function. In some examples, functions are called by a user application to execute privileged code that accesses data that is off limits to the user application. When the function program is complete, operation can return to the calling program. In response to the CALL instruction, the instructions of the function are fetched and executed. Typically, the last instruction in a function is a RETURN instruction that tells the speculative prediction circuit that instruction execution may return back to the calling program and resume at the next instruction after the CALL in the calling program. That next instruction is located at a memory address referred to as a return address 132. A return may be enabled by saving the return address 132 in response to the CALL instruction and retrieving the return address 132 in response to the RETURN instruction. In one example, the return address 132 is saved by "pushing" (i.e., storing) the return address on a return stack buffer 134 in response to the CALL instruction, and "popping" (i.e., reading) the return address 132 off the return stack buffer 134 in response to the RETURN instruction. In another example, the return address 132 may be stored in a storage location (e.g., a register that holds the most recent return address). In a RETURN situation, the speculative prediction circuit 128 makes a prediction of instruction flow based on the return address 132 and other information, such as the prediction history indicator 130. The prediction of instruction flow will be used to determine the next instructions 108 that will be fetched by the instruction fetch circuit 106.

Attacks on processor-based systems have been developed to recognize predictive behavior and manipulate instruction flow based on the recognized predictive behavior. Such manipulation can expose sensitive data or make the processor-based system vulnerable to external control. The return address 132 stored in the return stack buffer 134 has been the focus of malicious attacks to alter the direction of instruction flow for purposes of obtaining information and gaining control of a processor. The return stack buffer 134 includes features for mitigating such attacks, as described in further detail with reference to FIG. 2.

Figure 2:
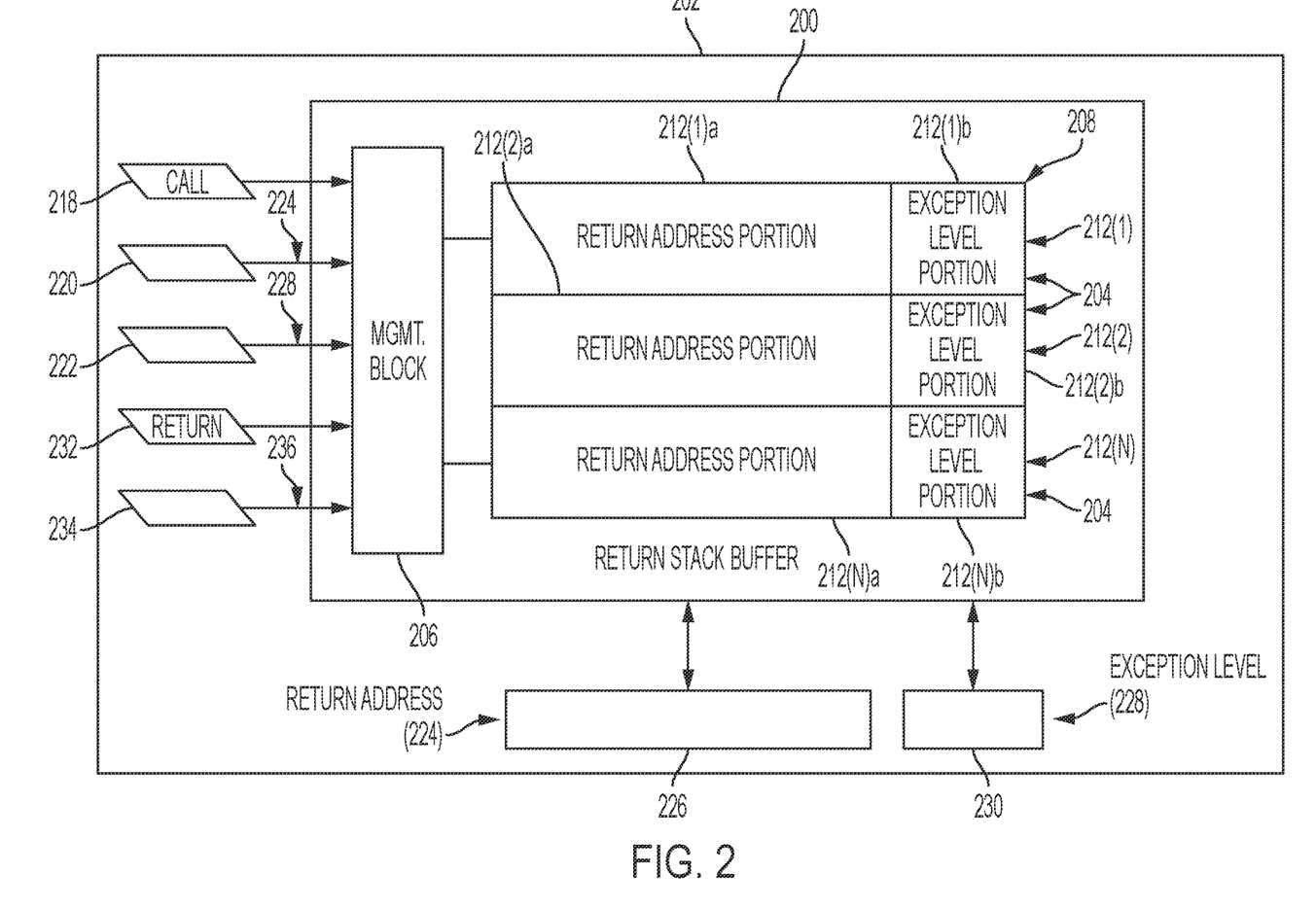
FIG. 2 is a block diagram of processor that includes a processing circuit including an exemplary return stack buffer circuit configured to mitigate side channel attacks based on function returns.

An exemplary return stack buffer circuit 200 ("return stack buffer 200") used in a processing circuit 202 configured to mitigate such attacks is shown in FIG. 2 and described below. FIG. 2 is a block diagram of the processing circuit 202 including the return stack buffer 200. The return stack buffer 200 comprises an array 208 of entries 204 coupled to a management block 206. The management block 206 (MGMT. BLOCK in FIG. 2) comprises hardware circuits. In this regard, the management block 206 may also be referred to herein as the management circuit 206. The array 208 of entries 204 comprises a first entry 212(1), a second entry 212(2), and a third entry 212(N). Although only three entries 204 are shown, the array 208 of entries 204 may comprise any number of entries 204 based on, for example, a maximum number of nested function calls supported in the processing circuit 202 or limitations on storage resources in the processing system 102. The entries 212(1)-212(N) comprise return address portions 212(1)a, 212(2)a, and 212(N)a, respectively, and exception level portions 212(1)b, 212(2)b, and 212(N)b, respectively. The management block 206 includes circuitry for controlling operations in the return stack buffer 200, including reading and writing to the entries 204, and further operations of the return stack buffer 200 as described below.

The return stack buffer 200 receives a call indication 218 indicating a function call, a return address indication 220, and a call exception level indication 222. Specifically, the management block 206 receives the call indication 218 in response to a CALL instruction being executed in a calling program, such as a user application. The management block 206 controls the return stack buffer 200 to respond to the call indication 218, which includes storing the return address indication 220 in the return address portion 212(1)a of the entry 212(1) and storing the call exception level indication 222 in the exception level portion 212(1)b of the entry 212(1). The return stack buffer 200 may be implemented as a stack, such as a Last-In-First-Out (LIFO) buffer, that stores return address indications 220 of nested function calls in the order in which the functions are called, with the return address indication 220 of the most recent function call in one of the array 208 of entries 204 corresponding to the "top" of the array 208.

The return address indication 220 and the call exception level indication 222 are received in conjunction with (e.g., simultaneously with or immediately before or after, and associated with) receiving the call indication 218. The call indication 218 indicates that the return address indication 220 and the call exception level indication 222 are to be stored in the return stack buffer 200 until a corresponding return indication is received.

The return address indication 220 may comprise a return address 224, comprising a memory address of a predicted next instruction. The term predicted next instruction refers to an instruction predicted to be executed next after a return from the function call. The predicted next instruction may be an instruction stored in a next sequential memory location adjacent to a memory location storing the function call instruction. Alternatively, the return address indication 220 may comprise an indication of a storage location 226, such as a register or other storage location in which the return address 224 of the next predicted instruction is stored. In this regard, the return address indication 220 may be a direct indicator of the return address or an indirect indicator of the return address.

The call exception level indication 222 may comprise a value indicating an exception level 228 associated with the return address 224. The exception level 228 corresponds to an application, program, or instruction stream that included the function call (e.g., called the function). As an example, a user application may have a different exception level 228 than an operating system. Alternatively, the call exception level indication 222 may comprise an indication of a storage location 230, which may be a register or other storage location in which the exception level 228 is stored. In this regard, the call exception level indication 222 may be a direct indication or an indirect indication of the exception level 228 associated with the return address 224.

The return stack buffer 200 keeps the return address indication 220 and the call exception level indication 222 stored in one of the entries 204 of the array 208 until the function call is completed, or they are no longer useful. To indicate the function is complete, the return stack buffer 200 receives a return indication 232, indicating a return from a function call. The return stack buffer 200 responds to a return indication 232 by reading the "top" entry 204 from the return stack buffer 200, which is also known as "popping" the entry 204 off the stack. In response to the return indication 232, the return stack buffer 200 accesses the entry 204 in the return stack buffer 200 and accesses the call exception level indication 222. As an example, accessing the entry 204 in response to a return indication 232 includes reading the return address indication 220 from the return address portion 212(1)a of the first entry 212(1), and reading the call exception level indication 222 from the exception level portion 212(1)b of the first entry 212(1). Reading the return address indication 220 includes either reading the return address 224 from the first entry 212(1) or reading an indication of the storage location 226 in which the return address 224 is stored. In the latter case, accessing the return address indication 220 would further include accessing the storage location 226 to read the return address 224.

Accessing the call exception level indication 222 includes reading the exception level 228 associated with the return address 224 from the first entry 212(1) (e.g., from the exception level portion 212(1)b) or reading, from the first entry 212(1), an indication of the storage location 230 in which the exception level 228 associated with the return address 224 is stored. In the latter case, accessing the call exception level indication 222 may further include accessing the storage location 230 to read the exception level 228 associated with the return address 224.

The entries 204 in the return stack buffer 200 may no longer be useful in the case of a software context change because, for example, the return indications 232 corresponding to the entries 204 in the return stack buffer 200 never occur, or the entries 204 of the return stack buffer 200 are overwritten by new function calls in the new software context before returning back to the previous software context.

In conjunction with receiving the return indication 232, the return stack buffer 200 also receives a return exception level indication 234 indicating an exception level 236 associated with the return. For example, when a function is called, an exception level 228 associated with the return address 224, which is based on the calling application, program, or function, may be forwarded to the function. In some examples, the function stores the exception level 228 provided in association with the function call and returns the exception level 228 as the exception level 236 associated with the return from the function call. In this regard, the exception level 236 associated with the return should match the exception level 228 associated with the return address 224. In an exemplary aspect, the return stack buffer 200 compares the exception level 236 associated with the return to the exception level 228 associated with the return address 224. Based on the comparison, the processing circuit 202 makes a prediction of instruction flow to determine a next instruction to be fetched for speculative execution. In some examples, a speculative prediction circuit 128 as shown in FIG. 1 makes a prediction of instruction flow and an instruction is fetched for speculative execution based on the prediction. In response to the exception level 236 associated with the return matching the exception level 228 associated with the return address 224, the processing circuit 202 may use the return address 224 for a prediction of instruction flow. On the other hand, in response to the exception level 236 associated with the return not matching the exception level 228 associated with the return address 224, the processing circuit 202 will not use the return address 224 for the prediction of instruction flow.

The management block 206 monitors software context changes as described with reference to FIG. 2 and may initiate corrective action in the return stack buffer 200 if the context change was not related to the exception level. For example, the management block 206 may be configured to detect an address space identifier (ASID) or virtual machine identifier (VMID) change in software context, and to initiate a flush of the return stack buffer 200 in response to such a software context change. In response to the exception level 236 associated with the return not matching the exception level 228 associated with the return address 224, the processing circuit 202 may generate a signal indicating a mismatch (e.g., return fault), which may indicate that a return stack buffer side channel attack has been attempted or an error has occurred. Instead of or in addition to generating a signal indicating a return fault, the management block may initiate corrective action.

Figure 3:
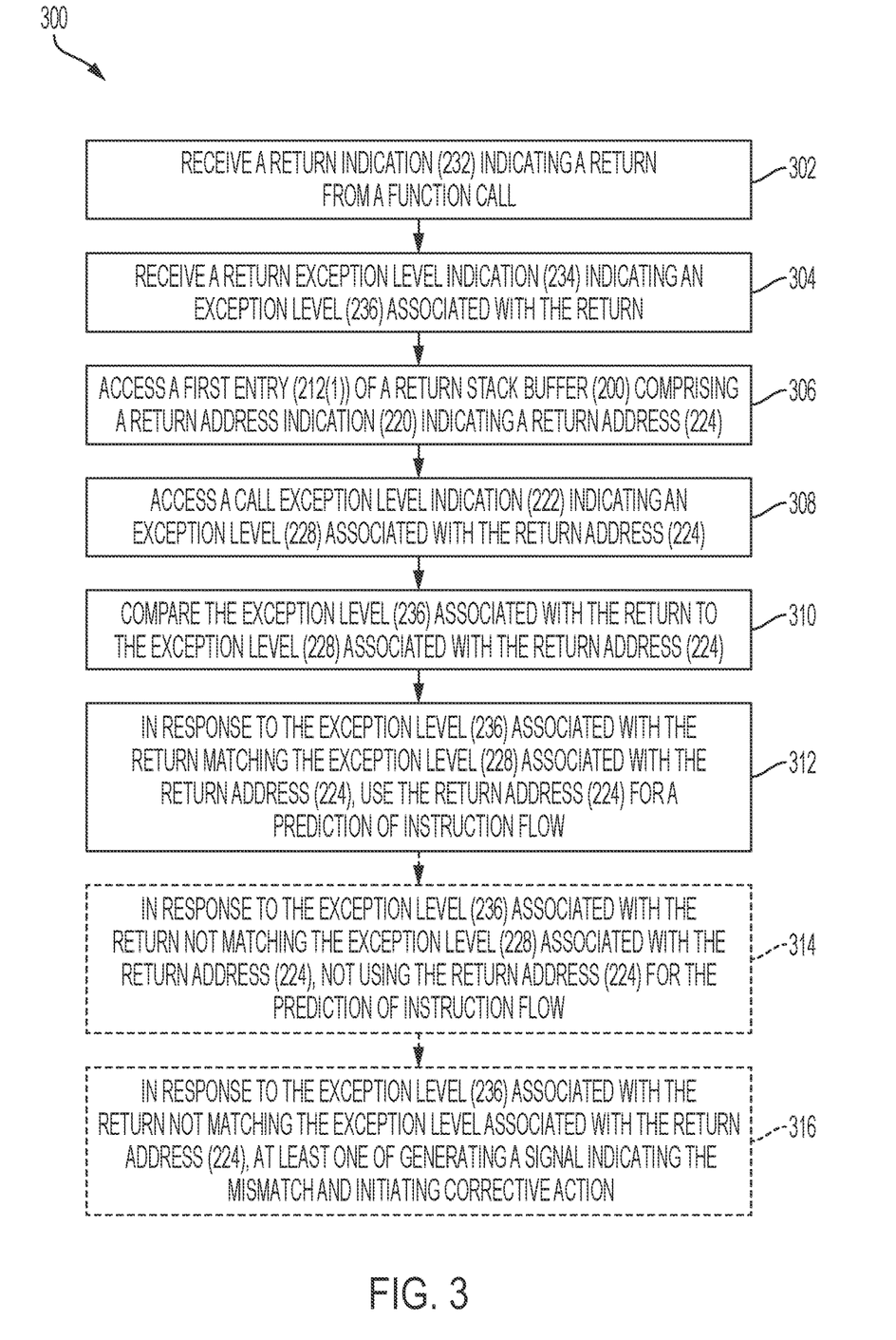
FIG. 3 is a flow chart illustrating an exemplary process of the processing circuit in FIG. 1 mitigating side channel attacks on a return stack buffer.

In this regard, FIG. 3 is a block diagram of a method 300 of mitigating side channel attacks on a return stack buffer. The method 300 includes receiving a return indication 232 indicating a return from a function call (block 302) and receiving a return exception level indication 234 indicating an exception level 236 associated with the return (block 304). The method includes accessing a first entry 212(1) of a return stack buffer 200 comprising a return address indication 220 indicating a return address 224 (block 306) and accessing a call exception level indication 222 indicating an exception level 228 associated with the return address 224 (block 308). The method further includes comparing the exception level 236 associated with the return to the exception level 228 associated with the return address 224 (block 310) and, in response to the exception level 236 associated with the return matching the exception level 228 associated with the return address 224, using the return address 224 for a prediction of instruction flow (block 312). The method may further include, in response to the exception level 236 associated with the return not matching the exception level 228 associated with the return address 224, not using the return address 224 for the prediction of instruction flow (block 314). The method may further include, in response to the exception level 236 associated with the return not matching the exception level associated with the return address 224, at least one of generating a signal indicating the mismatch and initiating corrective action (block 316).

Figure 4:
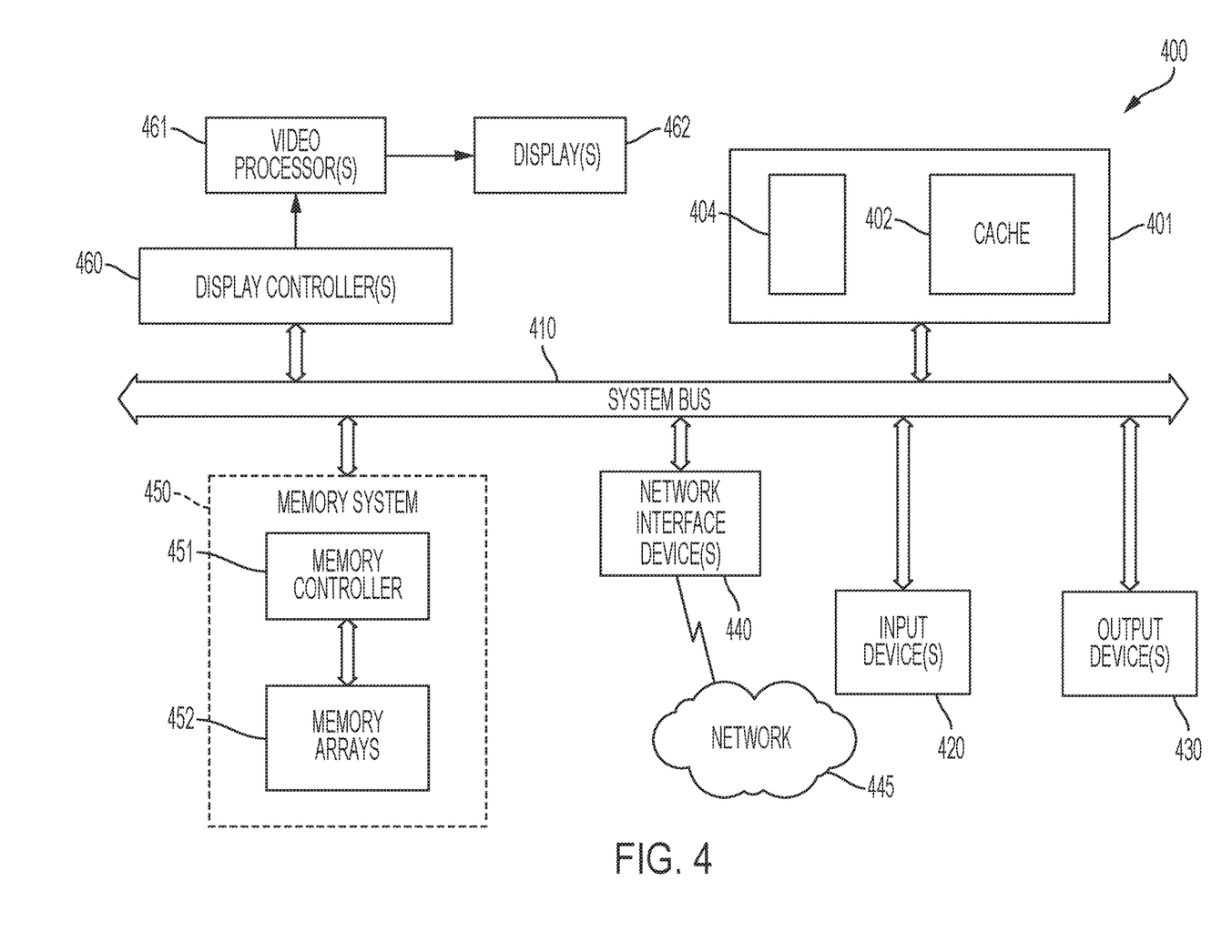
FIG. 4 is a block diagram of an exemplary processor-based system that includes a processor that includes a processing circuit configured to mitigate side channel attacks on a return stack buffer.

In this regard, FIG. 4 illustrates an example of a processor-based system 400 that can mitigate return stack buffer side channel attacks. In this example, the processor-based system 400 includes a processor 401 including a cache 402. The processor 401 corresponds to the processing circuit 202 in FIG. 1, which includes the return stack buffer 404 to mitigate return stack buffer side channel attacks. The processor 401 is coupled to a system bus 410 and can communicate with other devices by exchanging address, control, and data information over the system bus 410. For example, the processor 401 can communicate bus transaction requests to a memory controller 451 in a memory system 450. Although not illustrated in FIG. 4, multiple system buses 410 could be provided, wherein each system bus 410 constitutes a different fabric.

Other devices can be connected to the system bus 410. As illustrated in FIG. 4, these devices can include one or more input devices 420, one or more output devices 430, one or more network interface devices 440, and one or more display controllers 460, as examples. The input device(s) 420 can include any type of input device, including, but not limited to, input keys, switches, voice processors, etc. The output device(s) 430 can include any type of output device, including, but not limited to, audio, video, other visual indicators, etc. The network interface device(s) 440 can be any devices configured to allow exchange of data to and from a network 445. The network 445 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 440 can be configured to support any type of communications protocol desired. The memory system 450 can include the memory controller 451 coupled to one or more memory array 452.

The processor 401 may also be configured to access the display controller(s) 460 over the system bus 410 to control information sent to one or more displays 462. The display controller(s) 460 sends information to the display(s) 462 to be displayed via one or more video processors 461, which process the information to be displayed into a format suitable for the display(s) 462. The display(s) 462 can include any type of display, including, but not limited to, a cathode ray tube (CRT), a liquid crystal display (LCD), a plasma display, a light emitting diode (LED) display, etc.

The exemplary processing circuit 100 configured to mitigate return stack buffer side channel attacks according to aspects disclosed herein may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

In another exemplary aspect, an apparatus is provided that includes a return stack buffer comprising a plurality of entries, each entry having a return address portion and an exception level portion. The return stack buffer is configured to receive a return from a function call having an associated exception level and compare the exception level associated with a return with an exception level stored in a current entry of the return stack buffer. The return stack buffer is further configured to, in response to the exception level associated with the return matching the exception level stored in the current entry of the return stack buffer, use the current entry for prediction. The return stack buffer is further configured to, in response to the exception level associated with the return not matching the exception level stored in the current entry of the return stack buffer, not use the current entry for prediction.

In another exemplary aspect, a method is provided that includes, on a function call, storing a return address associated with the function call and an exception level associated with that return address in an entry of a return stack buffer. The method also comprises receiving a return from a function call having an associated exception level. The method also comprises comparing the exception level associated with the return with the exception level stored in a current entry of the return stack buffer. The method also comprises, in response to the exception level associated with the return matching the exception level stored in the current entry of the return stack buffer, using the current entry for prediction. The method also comprises, in response to the exception level associated with the return not matching the exception level stored in the current entry of the return stack buffer, not using the current entry for prediction.

In another exemplary aspect, a non-transitory computer-readable medium is provided. The non-transitory computer-readable medium stores instructions which, when executed by a processor, cause the processor to on a function call, store a return address associated with the function call and an exception level associated with that return address in an entry of a return stack buffer, receive a return from a function call having an associated exception level, compare the exception level associated with the return with the exception level stored in a current entry of the return stack buffer, and in response to the exception level associated with the return matching the exception level stored in the current entry of the return stack buffer, use the current entry for prediction, and in response to the exception level associated with the return not matching the exception level stored in the current entry of the return stack buffer, not use the current entry for prediction.

What is claimed is:

1. A processing circuit in a processor, the processing circuit configured to:
   receive a return indication indicating a return from a function call;
   receive a return exception level indication indicating an exception level associated with the return;
   access a first entry of a return stack buffer comprising a return address indication indicating a return address;
   access a call exception level indication indicating an exception level associated with the return address;
   compare the exception level associated with the return to the exception level associated with the return address; and
   in response to the exception level associated with the return matching the exception level associated with the return address, use the return address for a prediction of instruction flow.

2. The processing circuit of claim 1 further configured to:
   in response to the exception level associated with the return not matching the exception level associated with the return address, not using the return address for the prediction of the instruction flow.

3. The processing circuit of claim 2, wherein the processing circuit configured to not use the return address for the prediction of instruction flow is further configured to generate a signal indicating a return fault.

4. The processing circuit of claim 1, the processing circuit further configured to:
   receive a call indication indicating the function call;
   receive the return address indication;
   receive the call exception level indication;
   store the return address indication in the first entry of the return stack buffer; and
   store the call exception level indication.

5. The processing circuit of claim 4, wherein:
   the processing circuit configured to store the return address indication in the first entry of the return stack buffer is further configured to store the return address in the first entry of the return stack buffer; and
   the processing circuit configured to store the call exception level indication is further configured to store the exception level associated with the return address in the first entry of the return stack buffer.

6. The processing circuit of claim 5, wherein:
   the processing circuit configured to access the first entry of the return stack buffer is further configured to read the return address from the first entry of the return stack buffer; and
   the processing circuit configured to access the call exception level indication is further configured to read the exception level associated with the return address from the first entry of the return stack buffer.

7. The processing circuit of claim 4, wherein:
   the processing circuit configured to store the return address indication in the first entry of the return stack buffer is further configured to store, in the first entry of the return stack buffer, an indication of a first storage location comprising the return address; and
   the processing circuit configured to store the call exception level indication is further configured to store, in the first entry of the return stack buffer, an indication of a second storage location comprising the exception level associated with the return address.

8. The processing circuit of claim 7, wherein:
the processing circuit configured to access the first entry of the return stack buffer is further configured to read the return address from the first storage location indicated by the indication of the first storage location stored in the first entry of the return stack buffer; and
the processing circuit configured to access the call exception level indication is further configured to read the exception level associated with the return address from the second storage location indicated by the indication of the second storage location stored in the first entry of the return stack buffer.

9. The processing circuit of claim 1, wherein the processing circuit configured to use the return address for the prediction of the instruction flow is further configured to fetch an instruction for speculative execution based on the return address.

10. The processing circuit of claim 1, integrated into an integrated circuit (IC).

11. The processing circuit of claim 10, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

12. A method of authenticating a return address from a function call processed by a processing circuit in a processor, the method comprising:
receiving a return indication indicating a return from a function call;
receiving a return exception level indication indicating an exception level associated with the return;
accessing a first entry of a return stack buffer comprising a return address indication indicating a return address;
accessing a call exception level indication indicating an exception level associated with the return address;
comparing the exception level associated with the return to the exception level associated with the return address; and
in response to the exception level associated with the return matching the exception level associated with the return address, using the return address for a prediction of instruction flow.

13. The method of claim 12, further comprising:
in response to the exception level associated with the return not matching the exception level associated with the return address, not using the return address for the prediction of the instruction flow.

14. The method of claim 13, wherein not using the return address for the prediction of the instruction flow is further configured to generate a signal indicating a return fault.

15. The method of claim 12, the method comprising:
receiving a call indication indicating the function call;
receiving the return address indication;
receiving the call exception level indication;
storing the return address indication in the first entry of the return stack buffer; and
storing the call exception level indication.

16. The method of claim 15, wherein:
storing the return address indication in the first entry of the return stack buffer further comprises storing the return address in the first entry of the return stack buffer; and
storing the call exception level indication further comprises storing the exception level associated with the return address in the first entry of the return stack buffer.

17. The method of claim 16, wherein:
accessing the first entry of the return stack buffer further comprises reading the return address from the first entry of the return stack buffer; and
accessing the call exception level indication further comprises reading the exception level associated with the return address from the first entry of the return stack buffer.

18. The method of claim 15, wherein:
storing the return address indication in the first entry further comprises storing, in the first entry of the return stack buffer, an indication of a first storage location comprising the return address; and
storing the call exception level indication further comprises storing, in the first entry of the return stack buffer, an indication of a second storage location comprising the exception level associated with the return address.

19. The method of claim 18, wherein:
accessing the first entry of the return stack buffer further comprises reading the return address from the first storage location indicated by the indication of the first storage location stored in the first entry of the return stack buffer; and
accessing the call exception level indication further comprises reading the exception level associated with the return address from the second storage location indicated by the indication of the second storage location stored in the first entry of the return stack buffer.

20. The method of claim 12, wherein using the return address for the prediction of the instruction flow further comprises fetching an instruction for speculative execution based on the return address.

21. A non-transitory computer-readable medium comprising instructions which, when executed by a processor, cause the processor to:
receive a return indication indicating a return from a function call;
receive a return exception level indication indicating an exception level associated with the return;
access a first entry of a return stack buffer comprising a return address indication indicating a return address;
access a call exception level indication indicating an exception level associated with the return address;
compare the exception level associated with the return to the exception level associated with the return address; and
use the return address for a prediction of instruction flow, in response to the exception level associated with the return matching the exception level associated with the return address.

22. The non-transitory computer-readable medium of claim 21, further causing the processor to:

in response to the exception level associated with the return not matching the exception level associated with the return address, not using the return address for the prediction of the instruction flow.

23. The non-transitory computer-readable medium of claim 22, wherein instructions causing the processor to not use the return address for the prediction of the instruction flow further cause the processor to generate a signal indicating a return fault.

24. The non-transitory computer-readable medium of claim 21, further causing the processor to:
receive a call indication indicating the function call;
receive the return address indication;
receive the call exception level indication;
store the return address indication in the first entry of the return stack buffer; and
store the call exception level indication.

25. The non-transitory computer-readable medium of claim 24, wherein:
instructions causing the processor to store the return address indication in the first entry of the return stack buffer further cause the processor to store the return address in the first entry of the return stack buffer; and
instructions causing the processor to store the call exception level indication further causes the processor to store the exception level associated with the return address in the first entry of the return stack buffer.

26. The non-transitory computer-readable medium of claim 25, wherein:
instructions causing the processor to access the first entry of the return stack buffer further cause the processor to read the return address from the first entry of the return stack buffer; and
instructions causing the processor to access the call exception level indication further cause the processor to read the exception level associated with the return address from the first entry of the return stack buffer.

27. The non-transitory computer-readable medium of claim 24, wherein:
instructions causing the processor to store the return address indication in the first entry further cause the processor to store, in the first entry of the return stack buffer, an indication of a first storage location comprising the return address; and
instructions causing the processor to store the call exception level indication further cause the processor to store, in the first entry of the return stack buffer, an indication of a second storage location comprising the exception level associated with the return address.

28. The non-transitory computer-readable medium of claim 27, wherein:
instructions causing the processor to access the first entry of the return stack buffer further cause the processor to read the return address from the first storage location indicated by the indication of the first storage location stored in the first entry of the return stack buffer; and
instructions causing the processor to access the call exception level indication further cause the processor to read the exception level associated with the return address from the second storage location indicated by the indication of the second storage location stored in the first entry of the return stack buffer.

29. The non-transitory computer-readable medium of claim 21, wherein instructions causing the processor to use the return address for the prediction of the instruction flow further cause the processor to fetch an instruction for speculative execution based on the return address.

30. A processing circuit in a processor, the processing circuit comprising:
a means for receiving a return indication indicating a return from a function call;
a means for receiving a return exception level indication indicating an exception level associated with the return;
a means for accessing a first entry of a return stack buffer comprising a return address indication indicating a return address;
a means for accessing a call exception level indication indicating an exception level associated with the return address;
a means for comparing the exception level associated with the return to the exception level associated with the return address; and
a means for using the return address for a prediction of instruction flow in response to the exception level associated with the return matching the exception level associated with the return address.

* * * * *